United States Patent

Von Stein et al.

[15] 3,645,554
[45] Feb. 29, 1972

[54] SHOPPING CART

[72] Inventors: Gene B. Von Stein; Norman R. Young, both of Oklahoma City, Okla.

[73] Assignee: Unarco Industries, Inc., Chicago, Ill.

[22] Filed: May 4, 1970

[21] Appl. No.: 34,016

[52] U.S. Cl. ..................................280/33.99 R, 186/1 AC
[51] Int. Cl. ..................................................B62b 11/00
[58] Field of Search..................280/33.99; 186/1 AC

[56] References Cited

UNITED STATES PATENTS

| | | | |
|---|---|---|---|
| 2,958,537 | 11/1960 | Young | 280/33.99 C |
| 3,195,912 | 7/1965 | Howard et al. | 280/33.99 A |
| 3,052,319 | 9/1962 | Swanson | 280/33.99 F X |
| 2,644,695 | 7/1953 | Enders | 280/33.99 H |
| 2,837,344 | 6/1958 | Young | 280/33.99 B |
| 3,297,108 | 1/1967 | Davis | 280/33.99 F X |
| 3,503,622 | 3/1970 | Romero | 280/33.99 F |

Primary Examiner—Benjamin Hersh
Assistant Examiner—Milton L. Smith
Attorney—Lettvin and Gerstman

[57] ABSTRACT

A high-basket shopping cart for counter-level discharge is arranged for basket-telescoping storage with similar carts by providing a control handle for the cart which is at a convenient height when the cart is used for its intended purpose and which moves to an unobstructing position when the baskets telescope for purposes of storage.

10 Claims, 7 Drawing Figures

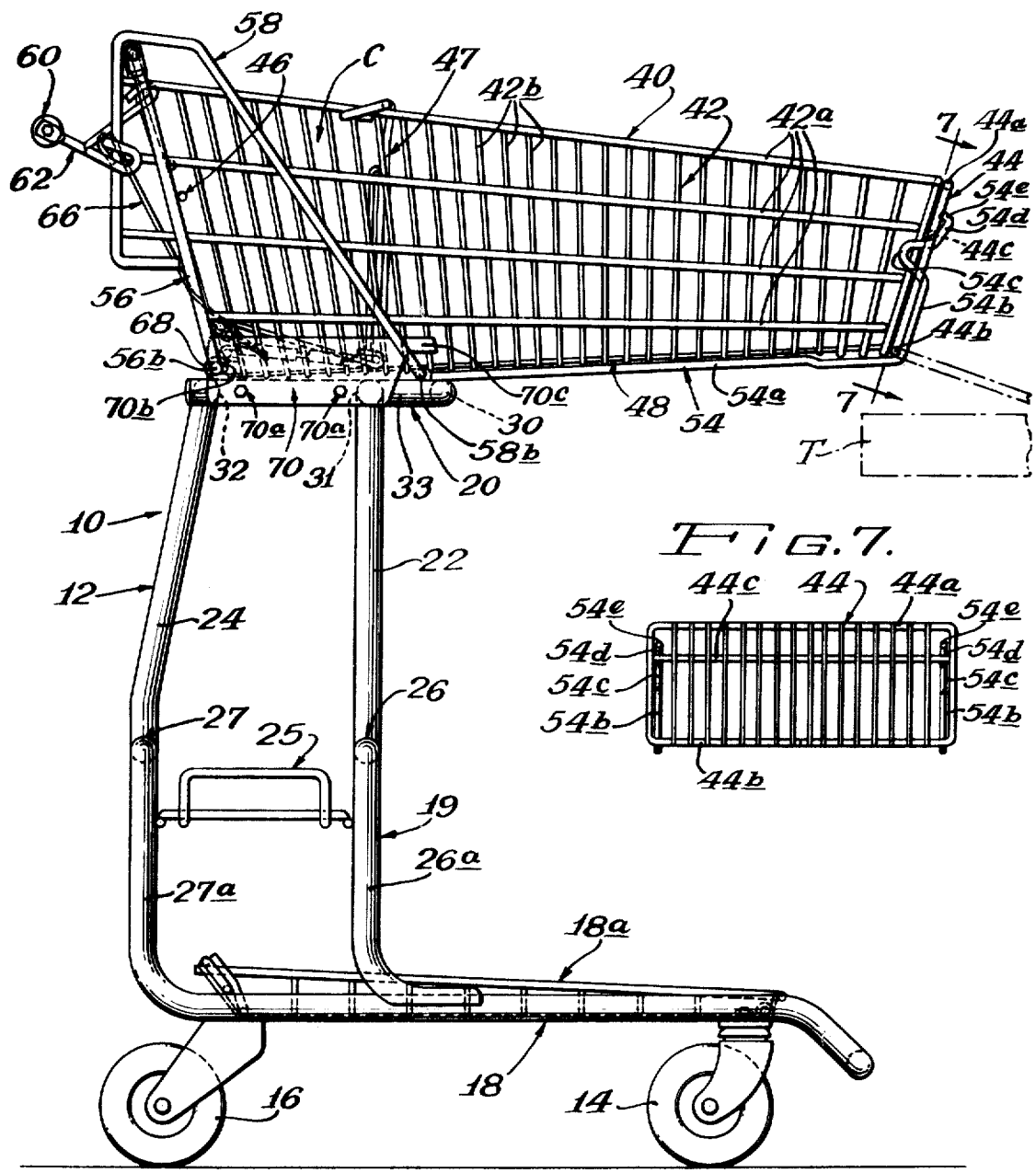

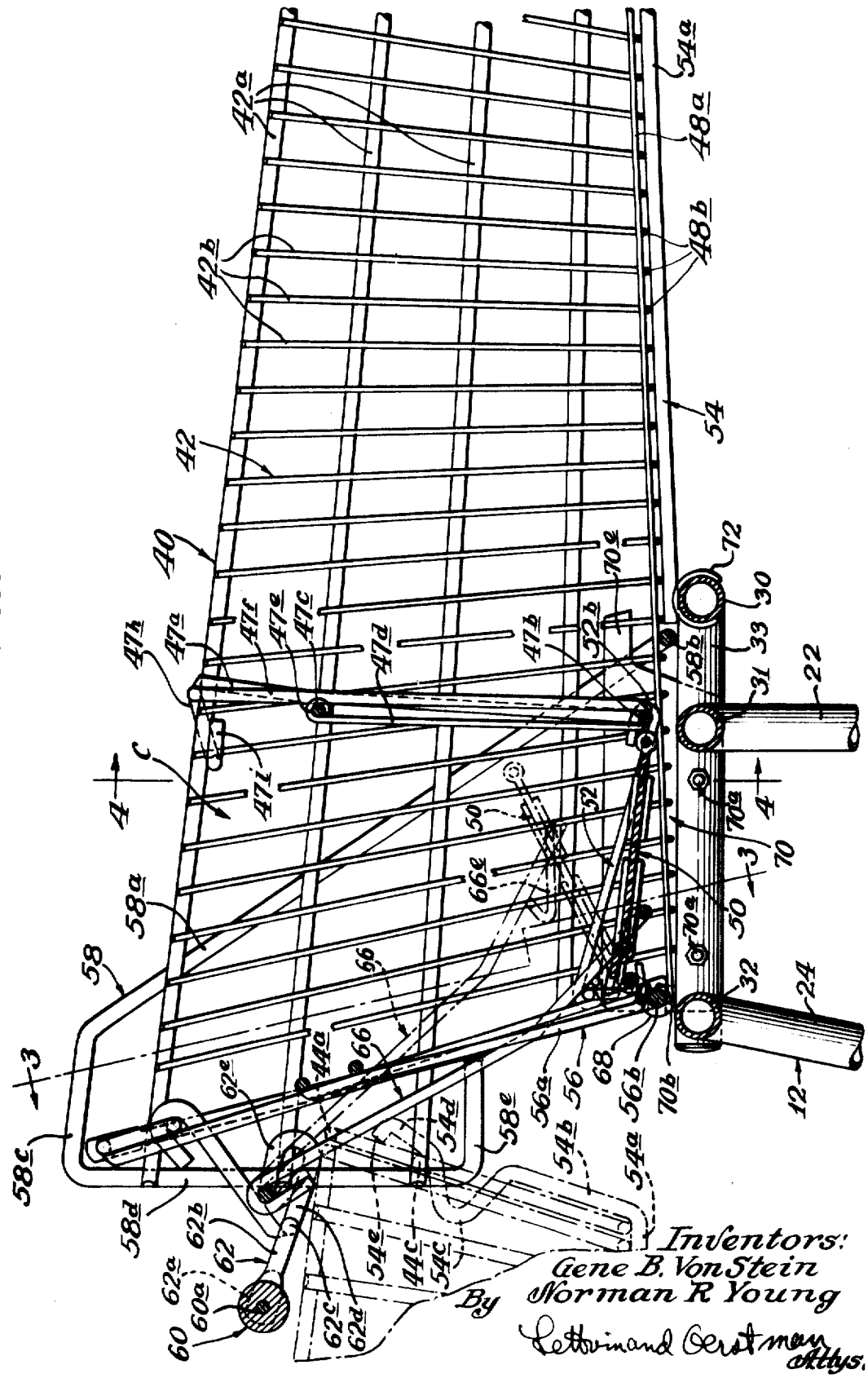

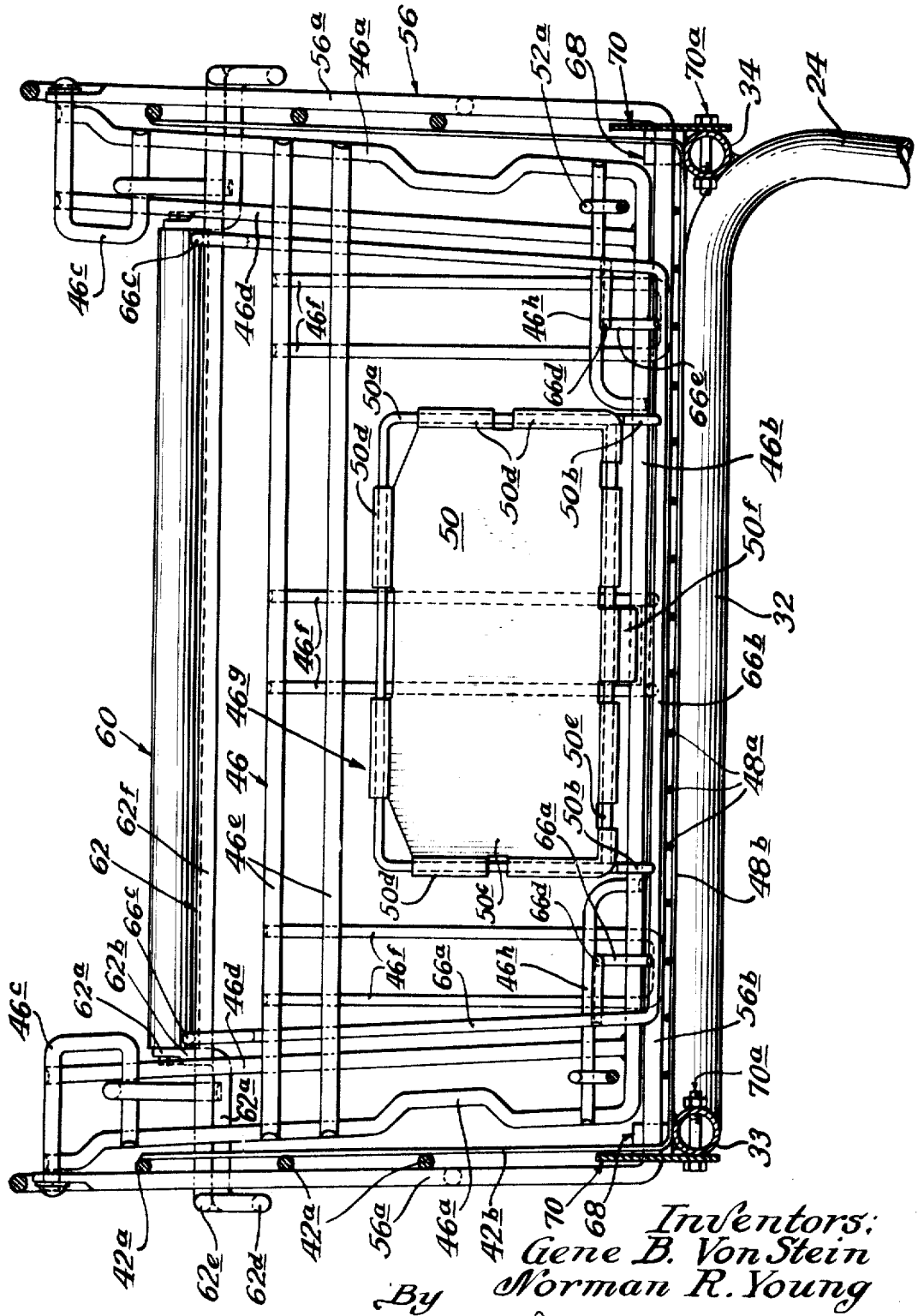

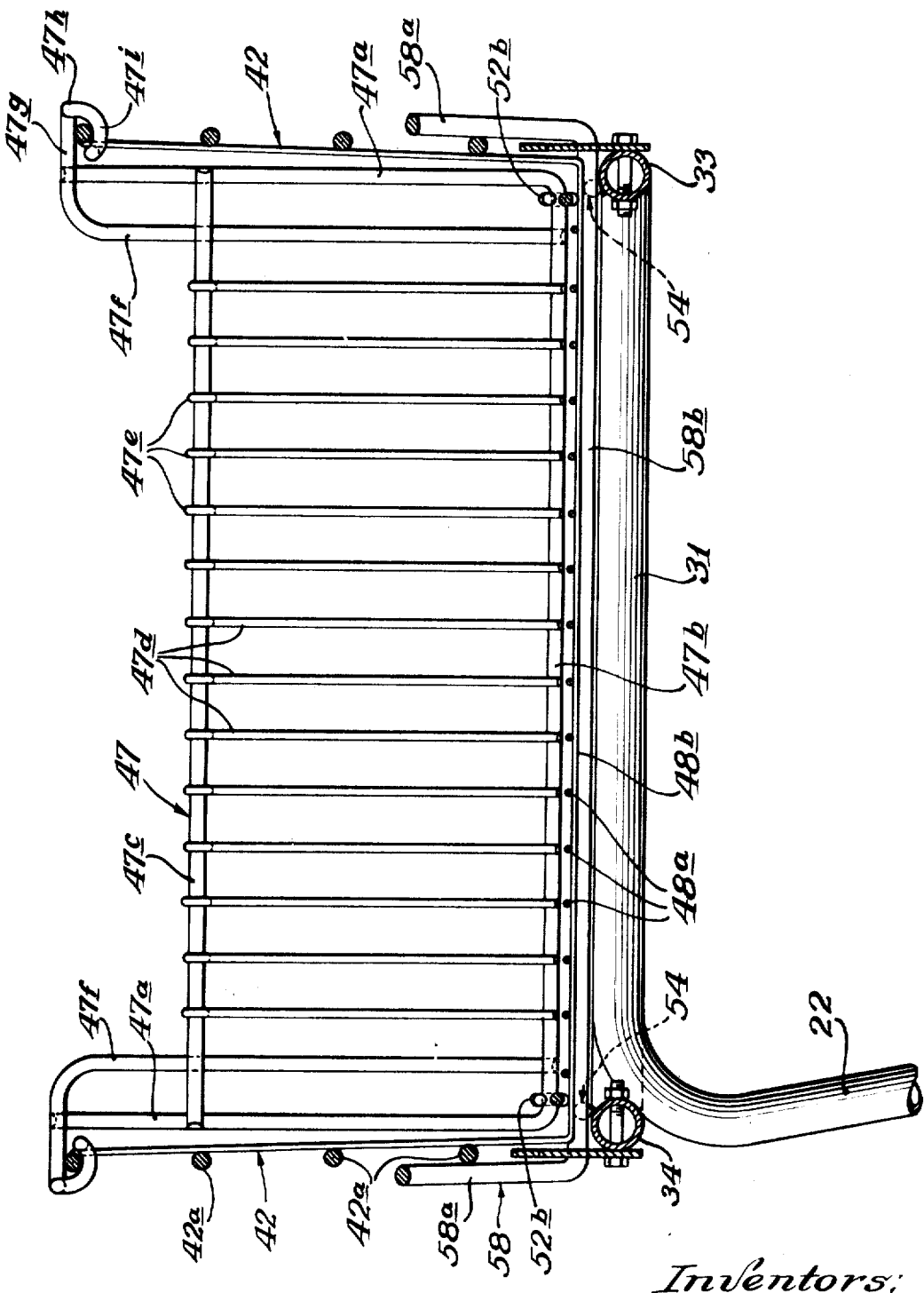

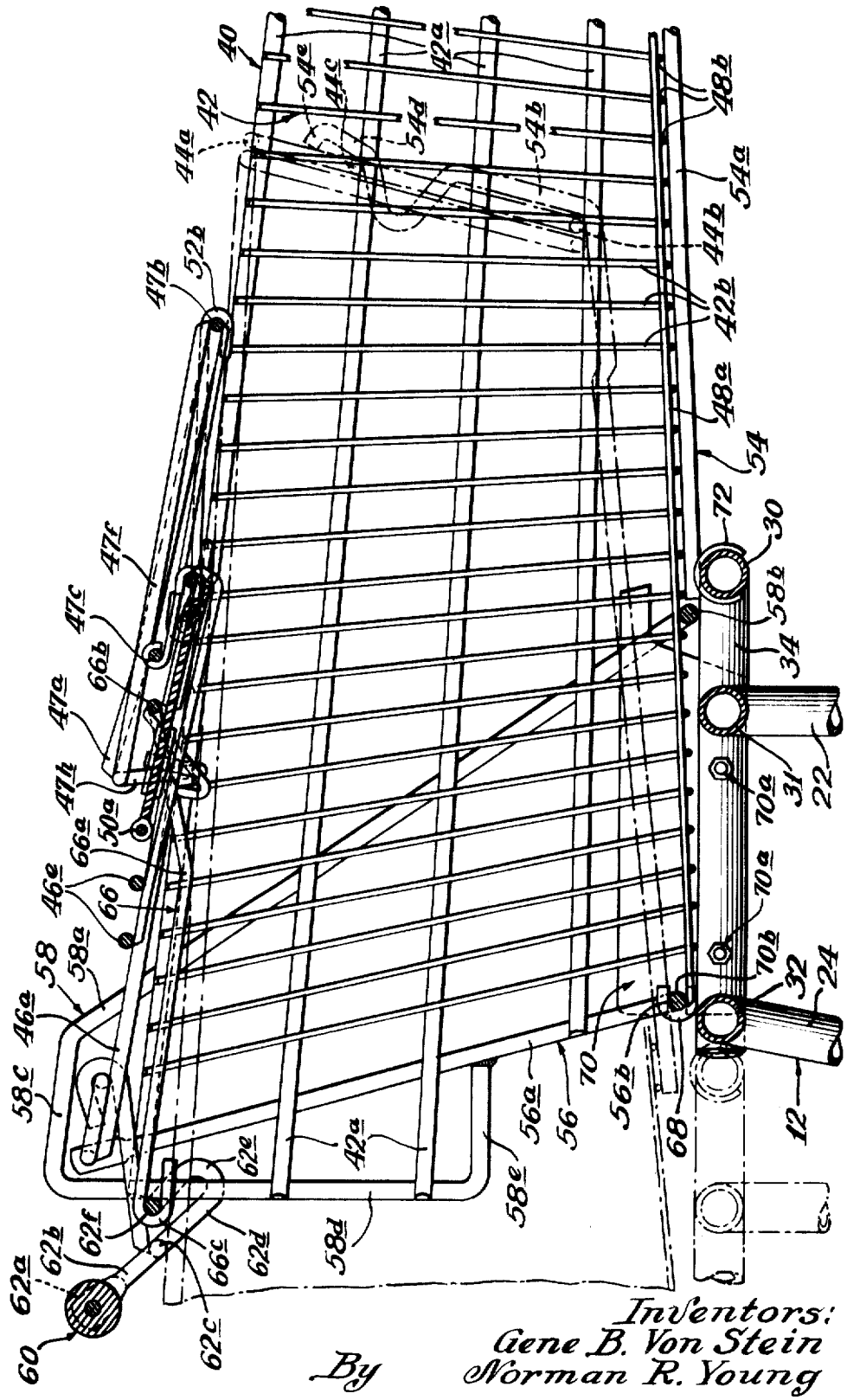

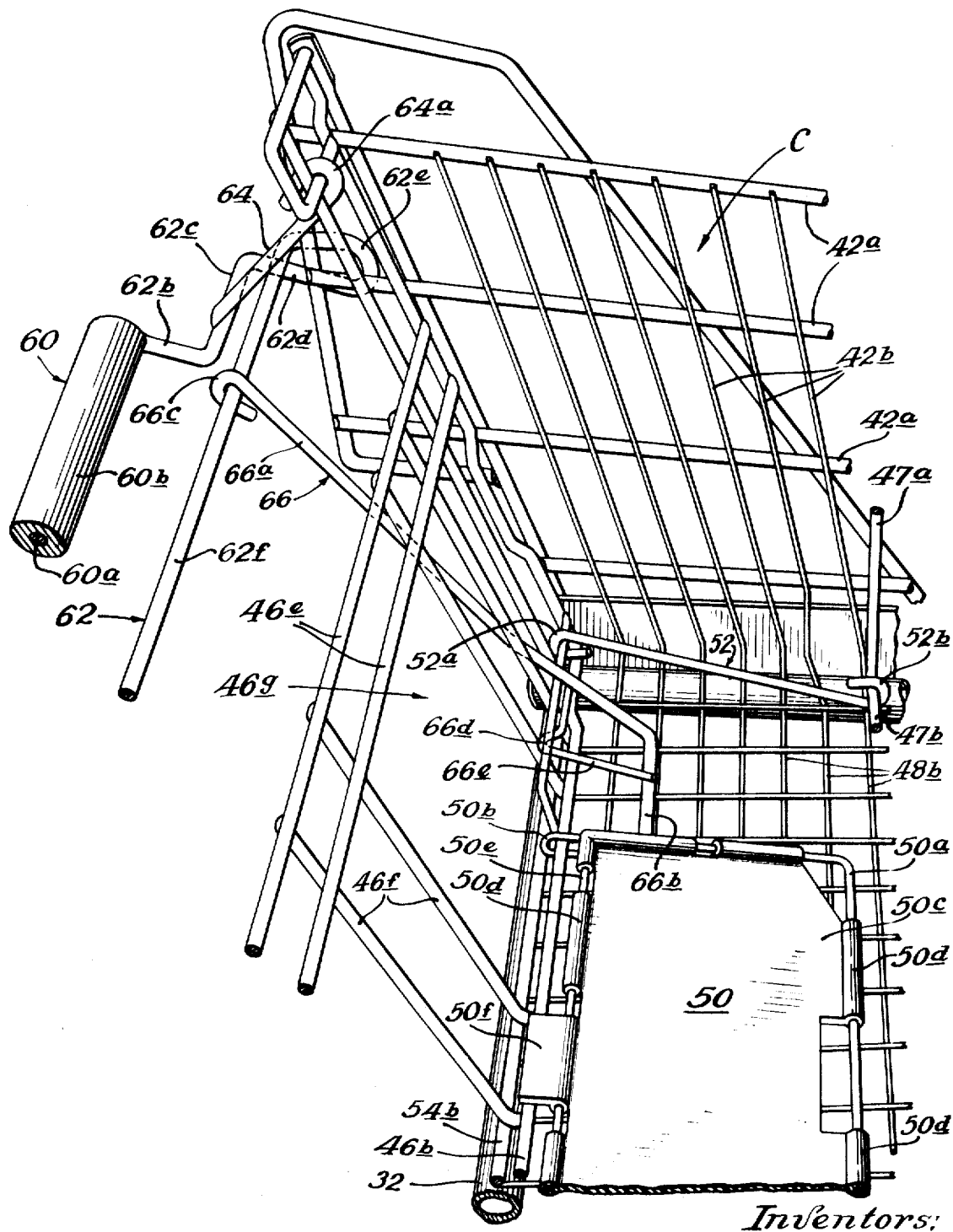

SHOPPING CART

BACKGROUND OF THE INVENTION

The use of shopping carts with telescoping baskets is well known in supermarkets. In prior devices the baskets of such carts were relatively low, i.e., a substantial portion of the basket was located below normal level of a checkout counter. The baskets in such prior devices had a forwardly tapering shape with both the upper and lower edges, or surfaces, of the basket being convergingly inclined in a direction extending forwardly of the rear of the cart to which a control handle was rigidly secured as the uppermost portion of the basket. By such an arrangement, the reduced forward end of each basket easily passed below the handle of a previous cart to permit telescoping of the front end of the basket on a cart through the movable rear end wall of the basket on the next preceding cart.

Recently it has been desirable to locate the basket of a shopping cart at a relatively high level, so as to facilitate discharge of the basket's contents directly onto the checkout counter. In such high-basket carts, the lower wall of the basket preferably is substantially horizontal and located substantially at or slightly higher than the normal height of the checkout counter. With such high-basket carts the control handle has preferably been located at a level intermediate the upper and lower limits of height of the basket. Both said features of the basket's substantially horizontal lower wall and the location of the control handle interfere with the telescoping of baskets as heretofore achieved with low-basket carts. Thus, in order to achieve telescoping storage of carts, high-basket carts have turned to the expedient of the basket itself swinging in a range of about 90° from a substantially horizontal position to a substantially vertical position, which permits the lower cart sections and the bottoms of the baskets to nest or telescope. While the expedient functions, it has problems associated with it, including problems accompanying the requirement that the basket must be swung to and maintained in a horizontal position to permit usage of the cart.

The instant invention is directed to a high-basket cart which permits of telescoping or nesting of baskets similar to that performed by low-basket carts and without requiring the baskets to move to an inoperative upright position from which they must be returned in order to be operative.

One object of the present invention is to provide a high-basket cart wherein the basket is permitted to move within a small range to overcome the normal substantially horizontal attitude of the lower wall of the basket, thus permitting endwise telescoping of the baskets of such carts.

Another object of this invention is to provide a high-basket cart with a control handle that is conveniently located rearwardly of the rear end of the basket between the uppermost and lowermost extents of the basket, and which control handle is arranged to be automatically moved to an out-of-the-way position when the baskets of a rearwardly adjacent cart is caused to telescope with the basket of the cart.

Still another object of this invention is to provide means which automatically connect the movable control handle for a basket cart in operative relation with the basket cart when the telescoping relationship between carts has been discontinued.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing.

BRIEF DESCRIPTION OF THE DRAWING

FIG. 1 is a side elevational view of a high-basket cart embodying the features of this invention, and illustrating generally the relationship of the basket to a checkout counter in a supermarket or the like;

FIG. 2 is an enlarged, fragmentary, side elevational view showing in full lines the rear end of the basket of the cart as in FIG. 1, and illustrating in broken lines the forward end of the basket of a rearwardly adjacent cart as it moves the inclined locking link for the handle means of the forward basket from its normal position shown in full lines to a release position shown in broken lines;

FIG. 3 is a fragmentary view taken substantially on line 3—3 of FIG. 2, looking rearwardly toward the rear upright wall of the basket, and illustrating the movable baby seat plate raised to its leg-aperture-blocking position;

FIG. 4 is a fragmentary view taken substantially on line 4—4 of FIG. 2, looking forwardly toward the forwardly located wall of the baby seat compartment of the cart's basket;

FIG. 5 is a view similar to FIG. 2 but showing the position of portions of two baskets after the forward end of the rearmost basket has telescoped into the forward one of the two baskets, and showing how the forward portion of the rearmost basket is raised, and how the movable baby seat compartment portion of the basket and the control handle of the forward basket are raised, by such telescoping action;

FIG. 6 is an enlarged fragmentary perspective view looking downwardly into and slightly rearwardly of the baby seat compartment of the cart's basket as seen in full lines in FIG. 2, this FIG. 6 being for purposes of clearly illustrating the relationship of the various parts; and FIG. 7 is a fragmentary view taken substantially on line 7—7 of FIG. 1.

DESCRIPTION OF THE PREFERRED EMBODIMENTS

Referring now to the drawings, the high-basket cart is generally designated at 10 and includes a support frame 12 of tubular metal construction supported on forward and rearward parts of wheels, or casters, 14 and 16. The frame 12 is shaped to provide a lower shelf support frame 18 that supports a generally horizontal wire shelf 18a, an intermediate-shelf support frame means 19, and an upper basket support frame 20 that are maintained in spaced relation by a pair of uprights 22 and 24. An intermediate shelf 25 is supported upon frame means 19 that includes the lower upright sections of uprights 22 and 24 and downturned legs 26a and 27a of angle-shaped tubing parts 26 and 27 whose horizontal runs are illustrated in FIG. 1. The basket support frame 20 is defined in part by tubing parts which secure to uprights 23 and 24, the latter uprights being located generally to one lateral side of the support frame 12, as seen in FIGS. 3 and 4.

Referring to the basket support frame 20, the same includes three transverse tubular elements 30, 31, and 32, from front to rear, and side tubular elements 33 and 34, all appropriately secured together by welding or the like to provide a rigid, substantially horizontal shelf. As shown, the two transverse tubular elements 31 and 32 may be extensions bent respectively from uprights 23 and 24, and the side tubular elements 33 and 34 may be legs of a U-shaped member whose bight serves as transverse elements 30.

A basket, generally 40, is supported and retained on basket support frame 20. The basket, as seen in FIG. 1, includes a pair of spaced upright side walls 42 which incline toward each other from the maximum spacing at the rear of the basket to minimum spacing at the front end of the basket, a front upright end wall 44, a rear upright end wall 46, an intermediate upright wall 47 and a bottom 48. The various wall are shown to be foraminous, being preferably defined by grids of welded wires as is well-known in the art. However, it will be understood that the walls may be of different form where desired except where structural requirements, as hereinafter set out, require provision of elements that serve the function of wirelike parts.

Referring to the basket 40, the side wall 42 thereof is defined by longitudinally extending wires 42a welded at points of intersection with the legs 42b of U-shaped transverse wires whose bights serve as elements 48b, part of the wire grid forming the bottom of the basket. A plurality of longitudinally extending wires 48a lie on and are welded to the upper or inner side of the bights 48b.

The front upright end wall 44 is of greater width than the spacing of sides 42 and is defined by a rectangular peripheral frame having upper and lower horizontal elements 44a and 44b, a third horizontal wire 44c closer to the top than to the bottom, heavy end wires 44d and a large plurality of upright intermediate wires 44e. The front end wall 44 is actually a gate that may be lowered as illustrated in broken lines in FIG. 1, by pivoting about bottom wire 44b, to define a ramp between the basket 40 and the top T of a counter, permitting discharge of the contents of basket 40 through the front end onto a counter top. A simple retainer for selectively holding end wall 44 in upright position as in FIG. 1 or releasing same is provided by basket outer wires as hereinafter described.

The basket 40 also provides a baby seat compartment, generally C, that corresponds generally with baby seat compartments defined in low-basket carts of the prior art wherein the baby faces rearwardly with its legs protruding outwardly through the rearmost wall of the basket. The baby seat compartment here is defined by rear upright end wall 46 with leg holes, intermediate upright wall 47 serving as the back support for child, and leg closure flap 50 that when lowered, as in FIGS. 2 and 6, serves as a seat for the child, and when raised as in FIG. 3 serves to close off the leg holes and to define a subsection of the basket for holding articles in the baby seat compartment.

FIG. 3 shows the end wall 46 as being defined in part by heavy wires one of which is a generally U-shaped wire defining spaced legs 46a and bight 46b, an inwardly extending U-shaped upper loop 46c at the upper end of each leg 46a, a second upright leg 46d space inwardly of leg 46a and horizontal cross wires 46e secured to legs 46a and 46d below the loops 46c. The portion of end wall 46 that functionally serves to confine goods in the baby seat compartment C extends vertically between bight 46b and the uppermost one of the cross wires 46e. The wall 46 also includes three spaced pairs of upright wires 46f, each pair being the legs of a U-shaped wire that extends vertically from below bight 46b to the upper cross wire 46e. The spacing of said U-shaped wires is such as to define two spaced leg holes 46g which straddle the centermost one of said U-shaped wires. At each lower corner of wall 46 there is an angle shaped wire 46h whose long leg is parallel to and spaced above bight 46b, and whose free lateral end connects to the inside of leg 46a. The short leg of 46h is located in space 46g and connects to the upperside of bight 46b.

The flap 50 is centered and attached to bight 46b between the points of connection of the short legs of the two angle wires 46h to bight 46b. Thus, the free ends of the U-shaped periphery wire 50a of leg closure flap 50 are looped at 50b to provide pivot loops about bight 46b that accommodate movement of leg closure flap 50 between the position of FIGS. 6 and 3. The closure flap 50, as is known in the art, may include a plastic sheet member 50c with integral peripherally located rings, or sleeves, 50d thereon for receiving therethrough the periphery wire 50a and also supplemental cross wire 50e. A central tab 50f on member 50c extends to a position for engagement and cooperation with a cross wire, bight 46b, of the wall 46.

FIG. 4 shows the upright intermediate wall 47 as formed by a U-shaped peripheral wire providing spaced legs 47a and a bight 47b, a horizontal cross wire 47c, a plurality of upright intermediate lighter wires 47d welded at their lower end to bight 47b and looped at 47e at their upper ends to curl around the forward side of cross wire 47c, and a pair of angle shaped heavy wires 47f. The angle shaped wires 47f each have a long leg located inwardly adjacent and parallel to leg 47a and secured at its free end to bight 47b. The short leg of angle wire 47f secures to the upper free end of leg 47a and extends laterally outwardly of leg 47a to provide a loop connection with uppermost longitudinal wire 42a that includes section 47g extending laterally outwardly of leg 47a and above said uppermost wire 42a, a rearwardly extending run 47h and a hook-shaped inwardly extending offset 47i that extends first below said wire 42a and then inwardly thereof, as best seen in FIGS. 2 and 4, with the terminus running back in the direction toward section 47g and spaced from 47h.

The lower ends of upright walls 46 and 47 are linked together to move in unison and to lie substantially flat when in the position of FIG. 5 and to be properly spaced to define the baby seat compartment C when in the position of FIGS. 2 and 6. Such links are shown at 52 with loop 52a at one end of link 52 encircling the long leg of angle wire 46h between upright wires 46a and 46d, and with loop 52b at the other end of link 52 encircling bight 47b between upright wires 47a and the long leg of 47f.

In accord with the invention herein, the basket 40 is provided with additional frame structure, with a control handle connected thereto, and with latching means that will now be described.

Considering first the forward end of the basket 40, a pair of spaced elongated heavy outer wires 54 positioned inwardly of basket sides 42, as seen in FIG. 4, extend longitudinally along the outside of the bottom 48 of basket 40 from a position just overlying the front transverse wire 30 to the forward end of the basket where the wires are bent upwardly as seen in full lines in FIG. 1 and in broken lines as seen in FIG. 5. The wires 54 define cam engaging rail portions 54a on the underside of bottom 48 and then turn upwardly to form elongated retainer 54b, rear-turned abutment 54c, and upper open-ended retainer 54d with inturned hook end 54e. The cam wires 54 are welded to the transverse wires 48b of the bottom and are so positioned that at their forward end the rear-turned abutment 54c is adjacent and welded to the inner side of the forwardmost leg 42b of side 42. For purposes of rigidity the three forwardmost U-shaped wires that provide legs 42b and 48b are of heavier wire, as seen in FIGS. 1, 2 and 5. The retainer portion 54b is spaced from lower portion of leg 42b to provide an elongated slideway in which cross peripheral wire 44b is located. The intermediate cross wire 44c enters open-topped retainer 54d when the gate 44 is in closed position. The hook end 54e prevents inadvertent unlatching of the gate 44, since pressure of the contents of the basket 40 forces gate 44 forwardly. The length of slideway defined by retainer 54b is sufficient to permit wire 44c to clear the upper end of wires 54 to permit unlatching of the gate.

Toward the rear end of the basket, two heavy outer wires are provided on the basket. The first is a rearwardly inclined U-shaped wire 56 at the rear end of the basket providing upright legs 56a welded to longitudinal side wires 42a and a pivot bight 56b welded to the upper side of longitudinal side wires 48a. The upper ends of legs 56a are flattened to provide for a rigid screw connection with the upper leg of loop 46c as seen in FIG. 3. The second outer wire 58 has a more complex U-shape including rearwardly inclined upright legs 58a welded to side wires 42a and bight 58b welded to the underside of bottom wires 48a. The bight 58b is located near the rear terminal ends of outer cam wires 54 as seen in FIG. 2. The legs 58a are inclined rearwardly at a greater acute angle to horizontal than legs 56a, so that the wires tend to converge at their upper ends. However each leg 58a bends adjacent its upper end to define rearwardly extending segment 58c which passes over and rearwardly of the upper end of leg 56a and then bends to define an upright abutment section 58d which has a forwardly turned terminal 58e for rigid connection by welding to the rear of upright leg 56a.

A horizontal barlike control handle 60 is provided rearwardly of the cart and all portions of the basket. The handle 60 must have the characteristic of being graspable to manipulate the cart by forces applied thereto in both push (forward) and pull (rearward) directions. A mount for the control handle is provided by a generally U-shaped wire member 62 which is shaped to provide the following segments: a flattened terminal flange 62a (adjacent one end of handle 60) merging with a first leg 62b of an angled bend that turns laterally outwardly to provide a second, link attachment leg 62c that continues laterally outwardly of legs 56a and 58a on the basket to then bend forwardly at 62d and reverse bend above portions 62d at 62e until merging with inwardly extending abutment bight 62f that extends across the width of the basket and is positioned to engage and abut abutment sections 58d to transmit push forces from handle 60 to the basket and cart.

The wire member 62 attaches to handle 60 by any appropriate means such as bolt-secured bar 60a extending through a sleevelike hand grip 60b. The entire assembly of wire member 62 and handle 60 is swingably supported by links 64 which are each welded at one end to link-attachment leg 62c and at their other end loop at 64a around lower leg of loop 46c between upright adjacent legs 46a and 46d. When handle 60 is in lowered position of FIG. 2, the forward projections defined by segments 62d and 62e operate to embrace and prevent lateral movement by engagement with abutment sections 58d, as seen in FIG. 3.

In order to provide for transmission of pull (rearward) forces from handle 60 to the basket, a U-shaped link means 66 is provided having upwardly and rearwardly inclined legs 66a looped at 66c about abutment bight 62f at points inwardly of legs 62b, with the legs 66a passing crosswise through the plane of basket rear wall 46 so that bight 66b is located in child seat compartment C between upright walls 46 and 47. The legs 66a enter compartment C between upright wires 46d and adjacent leg 46f and above the long horizontal leg of 46h. A latch lug, or tooth, 66d serving as an abutment means is defined at the upper junction corner of an angle-shaped wire 66e mounted at each corner of the U-shaped link 66 and positioned to move under and engage a shoulder means on the rear wall 46 in the form of the portion of horizontal leg of 46h located between a pair of adjacent upright legs 46f, as seen in FIGS. 3 and 6. The bias of gravity causes link 66 to swing toward the latching position to normally prevent separation of said abutment and shoulder means. With a child seated on closure flap 50, inadvertent dislocation or unlatching is further prevented. With the latch 66d engaging part 46h, the handle 60 is restrained from rising and pull forces on handle 60 are transmitted to the basket and to the cart.

The basket 40 is arranged to pivot about the axis of bight 56b. Toward that end, two hinge members 68 are welded onto the basket support frame 20. The hinge members are U-shaped sockets mounted on legs 33 and 34 with their legs pointing forwardly of the basket and each having a bight whose radius of curvature corresponds with the radius of the wire bight 56b. The length of the legs of the U are sufficiently long to provide full support and enclosure for the entire width of bight 56b. A pair of retainer plates 70 are bolted at 70a to the exterior of legs 33 and 34 of the basket support frame 20. The rear edge of each retainer plate is provided with a notch, or recess, 70b that matches the size of bight 56b and operates to restrain the bight 56b from moving forwardly of and out of the hinge members 68. The plate 70b also has a forwardly extending finger, or flange, 70c that is spaced above frame 20 and overlies the bight 58b to provide a stop that engages bight 58b to limit upward movement of the basket.

The front transverse tubular element 30 of the frame 20 is provided with a resilient sleeve or sleeve segments 72 positioned to be abutted by outer cam rail portions 54a, to prevent marring and noise that would result from the basket bouncing or striking against element 30.

OPERATION

From the foregoing, the operation of the basket should be readily understood. In normal usage as seen in FIG. 1, the basket 40 is supported on frame 20. The gate 44 is closed. Gravity biases rear wall 46 clockwise (in FIG. 1) about the axis of the upper leg of loop 46c until the lower bight end of upright U-members 46f abut pivot bight 56b. The handle 60 is in its convenient position between the upper and lower boundaries, or reaches, of the rear wall of the basket. The uppermost forward corner of the basket is then at a level below the normal height of handle 60. Engagement of abutment elements 62f and 58d, exterior of the basket, and of latch abutment elements 66d and 46f inwardly of basket compartment C operate to transmit, respectively, push and pull forces from the handle 60 to basket 40.

In storing a pair of carts with their baskets telescoped, FIG. 2 shows approach of a rearward basket toward a forward basket. The uppermost forward end of the rear basket 40, shown as element 44a of the front gate 44, passes under handle 60 as seen in FIG. 2. The upper cross wire 44a engages the pair of legs 66a of link means 66 and operates to tend to pivot same about the axis of 62f, thereby effecting release of lug element 66d from latching relation with element 46f. Further forward movement is illustrated by broken lines in FIG. 2 which shows the bight 66b camming the seat flap 50 from its normal full-line position to a raised, broken-line position.

With the handle 60 released from its lowered, latched position, further entry of the forward end of the basket causes handle 60 and upright walls 46 and 47 to rise substantially to the position seen in FIG. 5. At the same time the lower side of basket 40 engages pivot bight 56b which serves as a cam, and cam rails 54a ride up over bight 56b raising the forward end of the rearmost basket slightly about the axis of its pivot bight 56b, to move the basket bottom 48 from a substantially horizontal attitude as in FIG. 1 to the inclined attitude seen in broken lines in FIG. 5. During the telescoping of baskets 40, as illustrated in FIG. 5, a transverse portion of wire 62, such as 62c or 62f is cammed upwardly by riding above the uppermost wire 42a on the rearward basket, and the degree of such raising may be selected depending upon which portion of wire 62 is selected to be engaged by the rearward basket.

FIGS. 3 and 4 show that in normal position the lower ends of walls 46 and 47 clear the upper surface of basket bottom 48 so that there is no interference between members including links 52 and loops 52b. FIG. 5 shows that with the walls 46 and 47 raised, the elongated nature of loop connection 47h and 47i of wall 47 cooperating with upper longitudinal wire 42a of basket side wall 42 provides a lost motion connection which accommodates the stacking, or layering, of the various wall members 46, 47 and 50 which are forced into elevated position by the upper inclined edge of upper wires 42a of the basket sides 42.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new and desire to secure by Letters Patent of the United States is:

1. A shopping cart for counter-level discharge from the basket thereof and for telescoping storage of the carts and baskets when not in use, comprising, in combination: a cart with an elevated basket support, an elongated basket on the basket support having rear and front ends and provided with a movable upright rear wall that permits telescoping of baskets, handle means operatively associated with the basket carrying cart for applying push and pull forces to the cart for controlling movement of the cart, the handle means including a handgrip that is normally positioned at a level between the upper and lower boundaries of the upright rear wall of the basket so as to be located at a convenient level for the user of the basket, but which is at a position to normally obstruct telescoping of the baskets, releasable means operatively connecting the handgrip to the basket upon a downward force being applied to the handgrip, and means on the basket adapted to be engaged by another basket for effecting release of the releasable means and for effecting movement of the handgrip upwardly away from its operative position to a position that permits telescoping of the baskets when the forward end of one basket begins to move toward a telescoping relationship with another basket.

2. A cart as in claim 1 wherein the basket has a forward end of reduced size relative to the upright rear wall of the basket and the lower wall of the basket is substantially horizontal to facilitate counter-level discharge of the basket's contents, the basket being mounted to pivot about a transverse axis adjacent the rear end of the basket so as to permit the front end of the basket to raise a mall amount to facilitate telescoping of each basket with another basket.

3. A cart as in claim 1 wherein the handgrip is spaced rearwardly of the rear wall of the basket and is linked to a pivot carried by the basket.

4. A shopping cart for counter-level discharge from the basket thereof and for telescoping storage of the carts and baskets when not in use, comprising, in combination: a cart with an elevated basket support, an elongated basket on the basket support having rear and front ends and provided with a movable upright rear wall that permits telescoping of baskets, handle means operatively associated with the basket carrying cart for controlling movement of the cart, the handle means including a handgrip that is normally positioned at a level between the upper and lower boundaries of the upright rear wall of the basket so as to be located at a convenient level for the user of the basket, but which is at a position to normally obstruct telescoping of the baskets, means on the basket for effecting movement of the handgrip to a position that permits telescoping of the baskets when the forward end of one basket begins to move toward a telescoping relationship with another basket, the handgrip being spaced rearwardly of the rear wall of the basket and being linked to a pivot carried by the basket, a releasable means operatively connecting the handgrip to the basket for transmitting control forces from the handgrip to the basket, the releasable means including a first abutment fixed on the basket, a second abutment located between the handgrip and its pivot and adapted to engage the first abutment for transmitting substantially only push forces from the handgrip to the basket, and interconnecting elements separate from said abutments for transmitting substantially only pull forces from the handgrip to the basket.

5. A shopping cart for counter-level discharge from the basket thereof and for telescoping storage of the carts and baskets when not in use, comprising, in combination: a cart with an elevated basket support, an elongated basket on the basket support having rear and front ends and provided with a movable upright rear wall that permits telescoping of baskets, handle means operatively associated with the basket-carrying cart for controlling movement of the cart, the handle means including a handgrip that is normally positioned at a level between the upper and lower boundaries of the upright rear wall of the basket so as to be located at a convenient level for the user of the basket, but which is at a position to normally obstruct telescoping of the baskets, means on the basket for effecting movement of the hand grip to a position that permits telescoping of the baskets when the forward end of one basket begins to move toward a telescoping relationship with another basket, the handgrip being spaced rearwardly of the rear wall of the basket and being linked to a pivot carried by the basket, releasable means operatively connecting the handgrip to the basket for transmitting control forces from the handgrip to the basket, the releasable means including a first pair of elements arranged to transmit substantially only push forces from the handgrip to the basket, and a second pair of elements arranged to transmit substantially only pull forces from the handgrip to the basket.

6. A shopping cart for counter-level discharge from the basket thereof and for telescoping storage of the carts and baskets when not in use, comprising, in combination: a cart with an elevated basket support, an elongated basket on the basket support having rear and front ends and provided with a movable upright rear wall that permits telescoping of baskets, handle means operatively associated with the basket carrying cart for controlling movement of the cart, the handle means including a handgrip that is normally positioned at a level between the upper and lower boundaries of the upright rear wall of the basket so as to be located at a convenient level for the user of the basket, but which is at a position to normally obstruct telescoping of the baskets, means on the basket for effecting movement of the handgrip to a position that permits telescoping of the baskets when the forward end of one basket begins to move toward a telescoping relationship with another basket, the handgrip being spaced rearwardly of the rear wall of the basket and being pivotally connected to the basket, a first means exterior of the basket for transmitting forces in one direction between the hand grip and cart, a second means interior of the basket for transmitting forces in a second direction between the handgrip and the cart, and connecting means interconnecting said first and second means to provide for complete control of the cart by the handle means.

7. A cart as in claim 6 wherein the connecting means is positioned to be automatically engaged by another basket moving into telescoping relationship with the basket and moved to a position which releases the interconnection of said first and second means and provides that the handgrip is pivoted away from its operative position to permit telescoping of the carts.

8. A cart as in claim 6 wherein the upright rear wall of the basket is foraminous and the connecting means includes at least one elongated rigid link extending through said foraminous rear wall.

9. A cart as in claim 6 wherein the second means includes shoulder means defined on the rear wall of the basket and abutment means on the connecting means for engaging the shoulder means on the rear wall of the basket.

10. A cart as in claim 9 including gravity biased means in the basket for normally preventing separation of the abutment means and shoulder means.

* * * * *